Dec. 5, 1967   D. L. PETERS   3,356,792
AUTOMATIC ELECTRON BEAM FOCUSING SYSTEM
Filed June 2, 1964   2 Sheets-Sheet 1

Dec. 5, 1967 D. L. PETERS 3,356,792
AUTOMATIC ELECTRON BEAM FOCUSING SYSTEM
Filed June 2, 1964 2 Sheets-Sheet 2

United States Patent Office 3,356,792
Patented Dec. 5, 1967

3,356,792
AUTOMATIC ELECTRON BEAM FOCUSING
SYSTEM
David L. Peters, East Northport, N.Y., assignor to
Hazeltine Research, Inc., a corporation of Illinois
Filed June 2, 1964, Ser. No. 371,915
7 Claims. (Cl. 178—7.2)

ABSTRACT OF THE DISCLOSURE

Apparatus for automatically controlling the focus of an imaging system such as a television camera. A charge representative of a reference object, such as a knife edge, is placed at a portion of the charge storage matrix which is not otherwise utilized to convey information. This charge is repetitively scanned at different focus settings with the rest of the charge storage matrix and an electrical signal is developed therefrom. Successive electrical signals are compared with respect to a common characteristic, such as the rise time, and control signals developed to change the focus of the system in the direction of the compared focus setting having the more desired rise time.

---

This invention relates to an automatic focusing system for use in an imaging device, such as a television camera or flying spot scanner, and more particularly to an apparatus for developing control signals for such an automatic focusing system.

In the example to be described, the invention is used in the environment of a television-type camera. Television cameras have been found suitable for many of the needs of space explorations. Television-type cameras such as the image-orthicon have been and will continue to be mounted in many satellites and space vehicles. However, such use of television-type cameras present difficulties which do not exist with the ordinary commercial use of such cameras, not the least of which is the maintenance of a proper focus of the camera.

Although there is no reason that the present invention could not be used in a manually operated camera, the problem of focusing is obviously not as critical when the camera is so used. For such uses the operator can adjust the focus before and even during the viewing of the particular program. However, the camera mounted in an unmanned satellite or even a manned space vehicle where the crew's attention would most probably be occupied with other problems, cannot be adjusted after launching. Therefore, there is a need for providing a means for automatically maintaining the camera in optimum focus condition.

As is well known, there are two essentially independent focusing systems in a television-type camera, the optical focusing system which must be adjusted to obtain the proper focal length of the lens system and electrical focus which must be adjusted to obtain the optimum spot size of the electron beam that scans the charge storage matrix of the tube. The invention disclosed herein can be used to develop control signals for the optical focus system. However, since the scene to be viewed will normally be at so great a distance that the focal length remains constant, it is anticipated the optical focus will be adjusted before launch and mechanically locked into position. The electrical focus cannot be so locked into place. Due to many factors, such as shock and vibration, the aging of components and severe changes in environmental conditions, such as temperature, the spot size of the electron beam will tend to vary with time and drift out of focus. Since these cameras must remain in optimum operation unattended for indefinite periods of time, it is essential that some means be provided for automatically maintaining the focus in optimum condition.

It is an object of the present invention therefore, to provide a new and improved device for developing control signals for an automatic focusing system.

It is also an object of the present invention to provide a new and improved device for developing control signals for an automatic focusing system for use in a television-type camera.

In accordance with the present invention in an adjustable focus imaging system wherein an interrogating beam is sequentially scanned over an image in order to derive electrical signals representative of the image, apparatus for automatically controlling the focusing of the system comprises first means for providing as part of the image a representative of a reference object. The apparatus also comprises second means for developing an electrical signal as a result of scanning the part of the image with the interrogating beam and third means responsive to the electrical signal developed by the second means for deriving control signals representative of the adjustments necessary to obtain the desired focusing of the system; whereby the control signals can be utilized to control the focusing of the system so as to provide the desired focus of said imaging system.

For a better understanding of the present invention together with other and further objects thereof, reference is had to the following description taken in connection with the accompanying drawings, and its scope will be pointed out in the appended claims.

Referring to the drawings:

FIG. 1 is a representation of an image orthicon, a television-type camera within which the invention described herein can be utilized. Although the theory of operation of the various types of television-type cameras vary to some degree, the means of focusing are similar and the present invention is equally applicable to many types.

Figure 1:
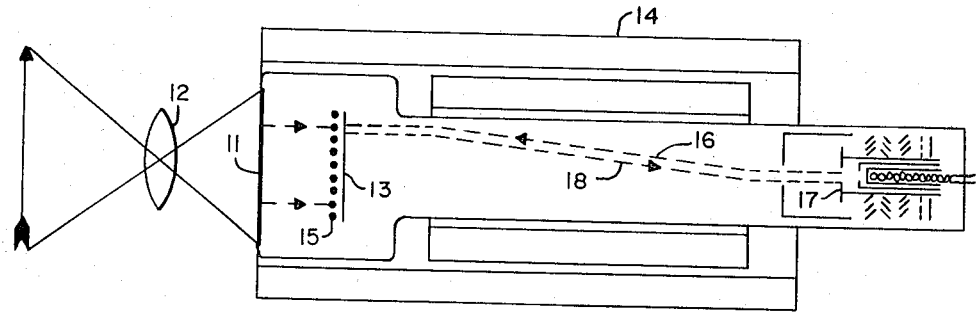
FIG. 1 is a representation of an image orthicon.

Basically the image orthicon operates as follows. Light from the scene to be televised is imaged onto the photo-cathode 11, a photo-emissive surface on the inside of the tube face, by the camera lens 12. The photo-electrons emitted by the photo-cathode 11 at a rate proportioned to the intensity of the incident light, are accelerated toward the target by an electron field and focused on the target or charge storage matrix 13, by the field of the focusing coil 14. The photo-electrons strike the charge storage matrix 13 with sufficient energy to eject several secondary electrons for each incident electron. These secondary electrons are collected by the fine mesh metal screen 15, mounted close to the charge storage matrix 13, which is maintained at slightly higher potential than matrix 13. There is left on the charge storage matrix 13 a pattern of positive charge which is a replica of the optical image projected onto the photo-cathode 11.

While the charge pattern accumulates on one side of the charge storage matrix 13 a finely focused interrogating electron beam 16, generated by electron gun 17, periodically scans the opposite side. Electrons from this interrogating beam strike the charge storage matrix 13, neutralizing it. A second beam 18 is thereby created which is reflected back in the direction of the electron gun 17. This second beam is used to derive electrical signals which represent the output of the camera. A more complete and detailed description of the image orthicon can be found in Susskind "Encyclopedia of Electronics," Reinhold Publishing Corporation, 1962, pages 363–365.

It is this interrogating electron beam and more particularly the focusing of this beam that the present invention is concerned with. The area this beam occupies on the target, when stationary, is known as the spot size and by focusing the beam is meant controlling the spot size. Television-type cameras are generally designed so that the optimum spot size is the size of a picture element, the size of a picture element being related to the area of the target and the number of scan lines. In a practical camera the electron gun and focusing systems are designed so that the minimum spot size that can be achieved is equal to or greater than the size of the picture element. Therefore, obtaining the optimum focus in a practical camera generally means obtaining the smallest spot possible and maintaining that spot size.

The present invention utilizes the principle that as the spot size of the interrogating beam is reduced, the frequency response of the return beam and the signal output of the camera is improved. This means that there is a broader frequency spectrum and more frequency components within the spectrum. As a result, when a part of a charge storage matrix which represents a scene which abruptly changes from one extreme to another, as from white to black, is continuously scanned by an electron beam there will be a sharper response as the spot size decreases. One way this improved frequency response is exhibited is by a faster rise time of the output signal. This rise time can be detected by differentiating the output signal and observing the amplitude of the differentiated signal. The faster rise time indicative of an improved frequency response which is, in turn, indicative of a better focus, is exhibited by the greater amplitude of the differentiated signal.

Figure 2:
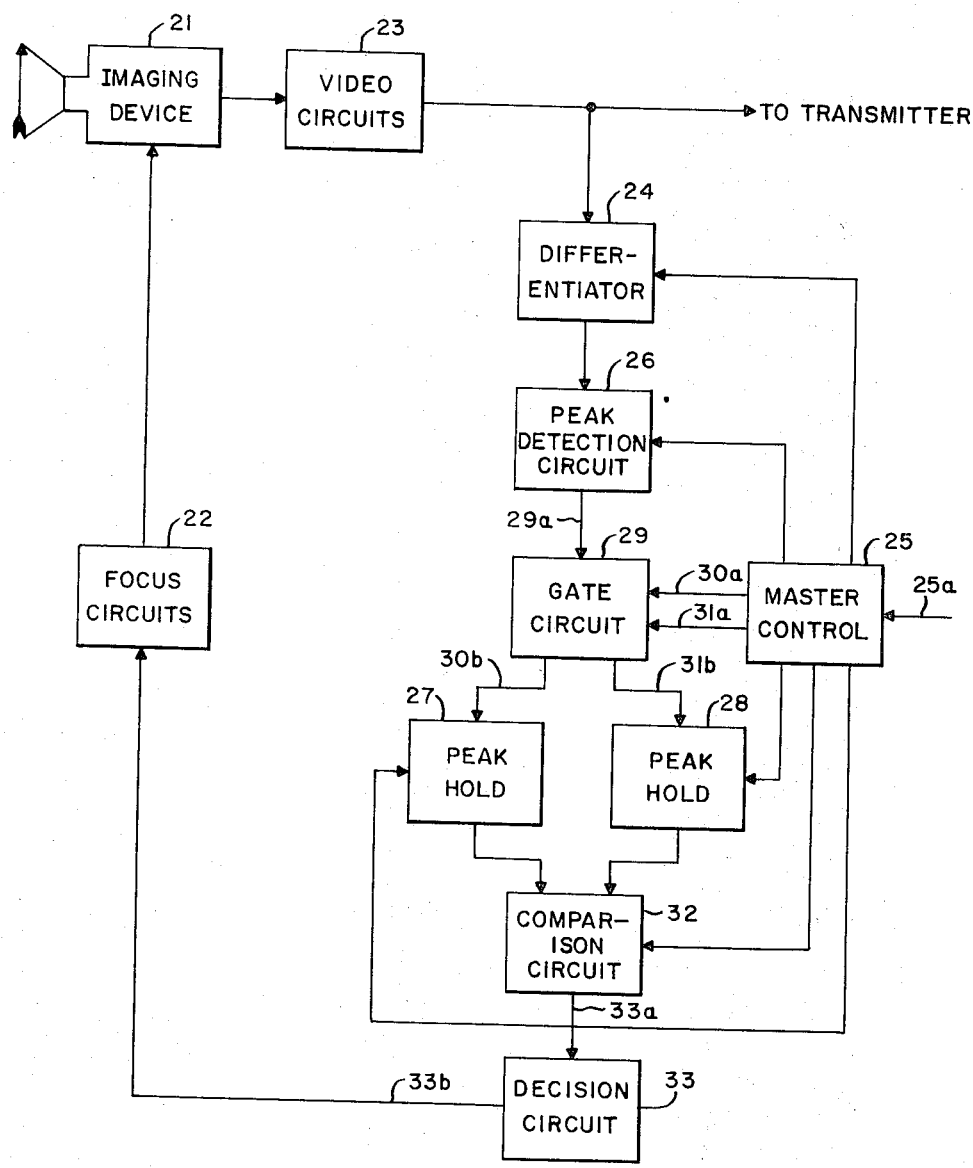
FIG. 2 is a block diagram representation of one embodiment of the present invention.

FIG. 2 is a block diagram presentation of one embodiment of the present invention. Very briefly, the FIG. 2 circuit operates by monitoring signals produced by scanning a part of the charge storage matrix having a known rate of change of intensity characteristic, as for example an area having a sharp black line on a white background. With optimum focus, the signals monitored will include a sharp pulse with fast rise time and fall. With poor focus, theses signals will indicate a slow rise time and fall. These monitored signals are processed to derive an indication of the focus and this indication is used to control the focus. The FIG. 2 circuit will now be described in detail and then in the section entitled "Mode of operation" the over-all operation will be described more fully.

The imaging device 21 is a television-type camera such as the image orthicon of FIG. 1. The imaging device includes a target such as charge storage matrix 13 of FIG. 1 which is sequentially scanned by an interrogating electron beam. The apparatus also includes a means for providing as part of the charge storage matrix 13 an electrical charge pattern representative of a reference object which has at least one sharp interface with a background illumination. This charge storage pattern can be placed upon the charge storage matrix in several ways. Generally it will consist of a pattern representing a vertical line on either the extreme right or left hand side of the charge storage matrix. It is so located on the charge storage matrix as not to be displayed by a receiver. The desired pattern can be achieved by scribing a line directly on the target, thereby preventing any charge from being developed along this line, the absence of charge in a negative modulation system corresponding to black. When charge is developed in the area of this scribed line, the scribed line will effectively represent a black line on an illuminated background. Another method is to actually use an optical reference consisting of an object causing a straight line to be imaged on the target, such as a knife edge, and, by means of split optics, to actually image this optical reference continuously onto the charge storage matrix. No matter how it is accomplished however, a charge pattern representative of a reference object, which has at least one sharp interface with the background illumination will be continuously provided on the charge storage matrix 13.

The apparatus also includes means for developing a plurality of first electrical signals individually representative of the scanning by said electron beam of the part of the charge storage matrix representative of the reference object at different focus settings of the electron beam, such as imaging device 21, operating in conjunction with the focus circuits 22. The electron beam scans the charge pattern representative of the reference object just as it scans the rest of the charge storage matrix and the focus circuits 22 supply the focus voltage which determines the spot size of the electron beam. A signal is developed each time the electron beam scans the portion of the charge storage matrix repersentative of the interface between the background illumination and the reference object. These signals are coupled to the video circuits 23 and as will subsequently be explained, if the electron beam is not at the desired focus a correction signal is developed and coupled to the focus circuits 22 to change the focus setting.

The FIG. 2 apparatus also includes means for differentiating the second signal representative of the scanning of the reference object and for rejecting all other signals from the differentiating means such as differentiator 24 operated in conjunction with master control 25. The differentiator 24 will differentiate the output signals from the video circuits whenever an enabling signal is supplied from the master control 25. The master control 25 supplies timing signals for several operations of the automatic focusing device, as will subsequently be explained. It is connected to the master synchronizer of the camera by lead 25a and derives its signals from this synchronizer which controls the scanning of the electron beam in the camera. The master control 25 will derive an enabling signal for the differentiator 24 in fixed time relation to synchronizing signals supplied by the master synchronizer. If the charge representative of the reference object is located at the left side of the charge storage matrix, an enabling pulse will be developed at the beginning of the active line time and be of such duration to enable the differentiator 24 to differentiate only the signal representative of the scanning of the reference object. If the charge representative of the reference object is located at the right side of the charge storage matrix, the enabling pulse will be developed near the end of the active line time.

The apparatus further includes means for detecting the maximum amplitude of the differentiated signals and for generating second signals individually representative of the maximum amplitude of each of said differentiated signals, such as peak detection circuit 26. Peak detection circuits are well known in the art and particularly the art of analog to digital converters. Peak detection circuits can take the form of resistor-capacitor charging networks having a short charge time and long discharge time. A typical ratio of discharge to charge time is 1,000 to 1. The apparatus also includes a plurality of storage means for storing individual ones of said second signals such as, peak hold circuits 27 and 28. These peak hold circuits are also well known in the art and can consist of resistor-capacitor charging networks having their discharge time to charge time ratio somewhere in the order of 1,000 to 1. However, the charge and discharge time of the peak hold circuits 27 and 28 will be considerably longer than those of the peak detection circuit 26.

Figure 3:
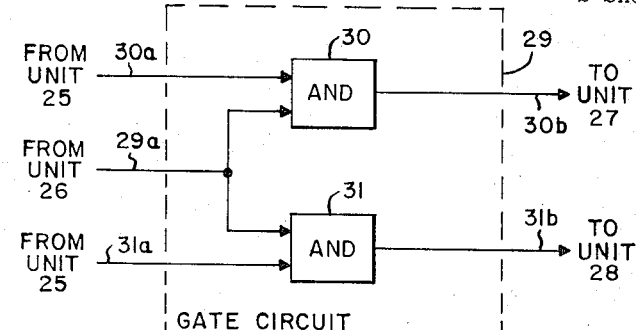
FIG. 3 is a block diagram presentation of a gate circuit which may be used in the embodiment of FIG. 2.

The apparatus of FIG. 2 also includes gating means for alternately coupling second signals individually representative of the maximum amplitude of said differentiated signals to individual ones of the plurality of storage means, such as gate 29 operated in conjunction with the master control 25. FIG. 3 is a more detailed description of gate 29. The output of the peak detection circuit 26 is coupled to amplifiers 30 and 31 by lead 29a. The outputs of the master control 25 are coupled to amplifiers 30 and 31 by leads 30a and 31a, respectively. The outputs of amplifiers 30 and 31 are coupled to peak hold circuits 27 and 28 by leads 30b and 31b, respectively. The signals supplied by leads 30a and 31a from master control 25 are mutually exclusive; that is to say, there can only be an enabling signal on one of these leads at any given time. Leads 30a and 31a could be individually coupled in the master control 25 to the output stages of a bistable element driven at the same repetition rate as the enabling signals coupled to the differentiator 24. In this manner the state of the bistable element would be changed each time a signal was differentiated, thereby changing the state of the enabling signals on leads 30a and 31a and amplifiers 30 and 31 would alternately be enabled thereby alternately coupling the second signals to peak hold circuits 27 and 28.

The apparatus also includes means for comparing at least two of said stored signals according to their amplitude, said compared signals including two most recent generated signals individually representative of the maximum amplitude of said differentiated signals, such as comparison circuit 32. The comparison circuit 32 includes a means for comparing outputs of the peak hold circuits 27 and 28 such as a difference amplifier. The two outputs of the peak hold circuits are coupled to separate control elements of the difference amplifier and an output signal is developed which is dependent on the difference in level of the two input signals. The comparison circuit 32 also includes a switching device, such as a relay, for alternately coupling the outputs of the peak hold circuits 27 and 28 to different ones of the control elements of the difference amplifier. The outputs of the peak hold circuits 27 and 28 are coupled to the switching device and the outputs of the switching device are coupled to the control elements of the difference amplifier. This switching device is required in order to maintain a reference for the difference amplifier, that reference being the last signal developed by the peak detection circuit 26. The switching device is driven at one-half the comparison rate so that the last signal developed by the peak detection circuit 26 is always coupled to the same control element of the difference amplifier. Therefore, a positive output of the difference amplifier will always indicate the last output of the peak detection circuit 26 was greater than the previous output and a negative output of the difference amplifier will always indicate the last output of the peak detection circuit 26 was less than the previous output.

The apparatus further comprises means responsive to said comparison means for determining which of said compared signals has a greater amplitude and for developing a signal to adjust the focus in the direction of the more desired setting, said setting corresponding to the signal having the greater amplitude, such as decision circuit 33.

Figure 4:
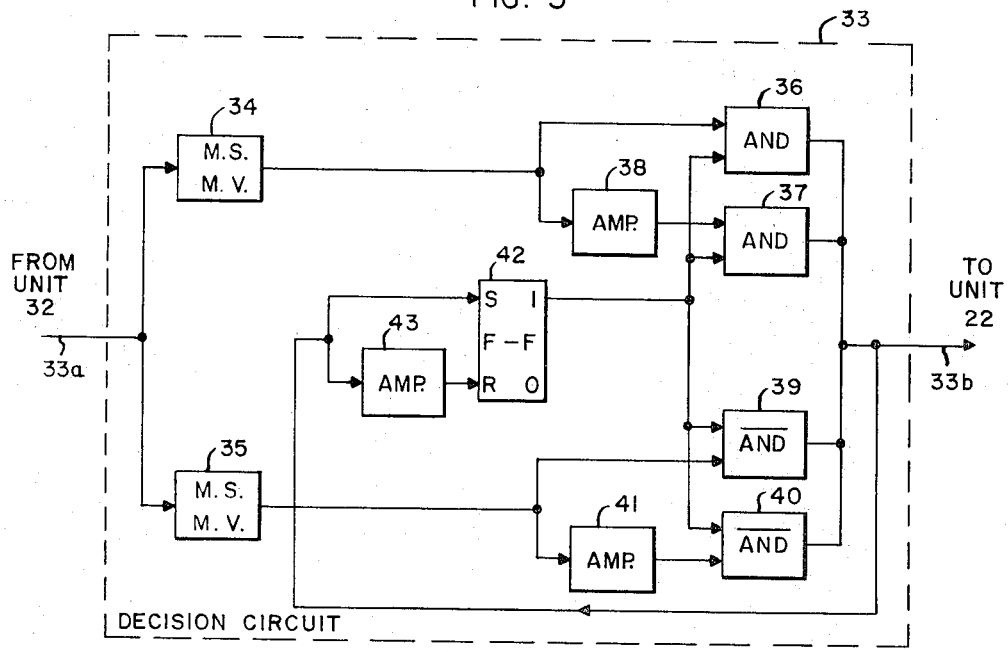
FIG. 4 is a block diagram presentation of a decision circuit which may be used in the embodiment of FIG. 2.

FIG. 4 is a more detailed description of the decision circuit 33. The output of the comparison circuit 32 is a signal that varies about a reference, such as zero volts. An output voltage above the reference voltage indicates the last output of the peak detection circuit 26 was greater than the previous one and therefore the focus voltage was changed in the right direction and should continue to be changed in the same direction. An output voltage below the reference voltage indicates the last output of the peak detection circuit 26 was less than the previous one and therefore the focus voltage was changed in the wrong direction and should be changed in the opposite direction.

The output of the comparison circuit 32 is coupled to monostable multivibrators 34 and 35 by lead 33a. Multivibrator 34 produces a positive going output pulse when the input level exceeds a predetermined positive level, while multivibrator 35 produces a negative going pulse when the input level exceeds a predetermined negative level. These threshold levels are established to prevent a correction signal from being developed when the output of the comparison circuit 32 is small, indicating the beam is in focus. The output of multivibrator 34 is coupled to AND circuit 36 and to AND circuit 37 by way of amplifier 38. Amplifier 38 merely reverses the polarity of the output signal of multivibrator 34. AND circuit 36 is constructed to produce a positive output when both inputs are positive while AND circuit 37 is constructed to produce a negative output when both inputs are negative. The output of multivibrator 35 is coupled to NAND circuit 39 and to NAND circuit 40 by way of amplifier 41. Amplifier 41 merely reverses the polarity of the output signal of multivibrator 35. NAND circuit 39 is constructed to produce a positive going output when both input signals are negative while NAND circuit 40 is constructed to produce a negative going output when both inputs are positive.

The second input to these four circuits, AND circuits 36 and 37 and NAND circuits 39 and 40, is the output from the set side of flip-flop 42. Flip-flop 42 is used to indicate the direction of the previous correction signal coupled to the focus circuits 22. If a positive going signal is coupled to the focus circuits 22, thereby increasing the focus voltage, a positive going signal is also coupled to the set side of flip-flop 42, placing the flip-flop 42 in the set condition. A positive going signal is thereby coupled to circuits 36, 37, 39 and 40. If a negative going signal is coupled to the focus circuits 22, thereby decreasing the focus voltage, a negative going signal is also coupled to amplifier 43. Amplifier 43 reverses the polarity of this negative going signal so that a positive pulse is coupled to the reset side of flip-flop 43 placing flip-flop 43 in the reset condition. A negative signal is thereby coupled to circuits 36, 37, 39 and 40. This combination of inputs to circuits 36, 37, 39 and 40 insures the proper output for each of the four possible combination of conditions that may exist. For instance, if the last signal coupled to the focus circuits 22 was positive and the output of the comparison circuit 32 is positive, the two inputs to AND circuit 36 are positive and there will be a positive pulse out of AND circuit 36 coupled to the focus circuits 22 thereby increasing the focus voltage by another incremental amount. If the last signal coupled to the focus circuits 22 was positive but the output of the comparison circuits 32 is negative (indicating the focus voltage was changed in the wrong direction), both inputs to NAND circuit 40 are positive and there would be a negative pulse output from NAND circuit 40 coupled to focus circuits 22 thereby decreasing the focus voltage by an incremental amount. Similarly it can be shown that proper outputs are produced for the other two possible conditions. The output of the decision circuit is coupled to the focus circuits 22 by lead 33b where the focus voltage is changed by an incremental amount in the direction indicated by this output signal. The reference object is then scanned by the electron beam at this new focus setting of the electron beam and a new comparison and decision made.

*Mode of operation*

As the electron beam scans the charge storage matrix 13 in imaging device 21, a signal is developed each time the electron beam scans the charge pattern representative of the interface between the reference object and the background illumination. This signal, along with the signals representative of the scanning of the rest of the charge storage matrix, is coupled to the video circuits 23 and from the video circuits 23 to the differentiator of the presently disclosed invention. Depending on the frequency of the comparisons desired, enabling pulses are coupled to the differentiator 24 from the master control 25 at a fixed rate and of such duration as to allow the differentiator 24 only to differentiate the signal representative of the scanning of the reference object. If an independent source of light is used to provide the background illumination about the reference object, an enabling signal can be coupled to the differentiator 24 each scan line and thereby differentiate each signal representative of the scanning of the reference object. However, if the background illumination of the scene being viewed is relied upon, it would probably be more desirable to only differentiate a signal representative of the scanning of the reference object once each field or frame to avoid the large variations that could exist in the line-to-line background illumination.

In either case the differential signal is coupled to the peak detection circuit 26 where the maximum amplitude of the differentiated signal is detected. A signal may be coupled from master control 25 to the peak detection circuit 26 to discharge the peak detection circuit 26 immediately preceding each enabling pulse coupled to the differentiator 24 so that succeeding signals are not added by the peak detection circuit 26. The output of the peak detection circuit is alternately coupled to peak hold circuits 27 or 28 by way of gate circuit 29. The signals contained in peak hold circuits 27 and 28 are coupled to the comparison circuit 32 to determine the relationship of their amplitude. In the preferred embodiment, the comparison circuit 32 is a triggered device and is activated by an enabling signal from the master control 25, this enabling signal being of such duration as to provide a pulse output from the comparison circuit 32. If this enabling signal is supplied, the monostable multivibrators 34 and 35 of the previously described decision circuit 33 can be replaced by diodes forward biased for positive going and negative going signals respectively and provided with the proper threshold levels. The inputs to the comparison circuit from peak hold circuits 27 and 28 are alternately switched by a switching means, such as a relay, driven at one-half the comparison rate in order to maintain the proper reference on the output of the comparison circuit 32. The last differentiated signal is always maintained as the reference so that a positive output from the comparison circuit 32 indicates the last differentiated signal was greater and the focus should continue to be changed in the same direction. A negative going signal from the comparison circuit 32 indicates the focus should be changed in the opposite direction.

The output of the comparison circuit 32 is coupled to the decision circuit 33 where this indication of the direction of change is converted to a signal which will actually increase or decrease the focus voltage in the indicated direction. The positive going or negative going pulse output of the decision circuit 33 is coupled to a stepping switch in the focus circuits 22. Each position of this stepping switch couples a different voltage to the focused potentiometer of the focused circuits 22, the difference between succeeding positions being an incremental value of voltage. If a positive pulse is coupled to the focus circuits 22 from the decision circuit 33, the stepping switch will step one position forward thereby coupling a voltage, an incremental amount larger than the preceding voltage to the focus potentiometer. If a negative pulse is coupled to the focus circuits 22 from the decision circuit 33, the stepping switch will step one position backward thereby coupling a voltage, an incremental amount smaller than the preceding voltage, to the focus potentiometer in the focus circuits 22.

The reference object is then scanned by the electron beam at this new setting of the focus voltage, a signal developed, differentiated, peak detected, compared with the previous signal and a new decision made as to the direction of change. This process is repeated until the optimum focus is obtained.

Figure 5:
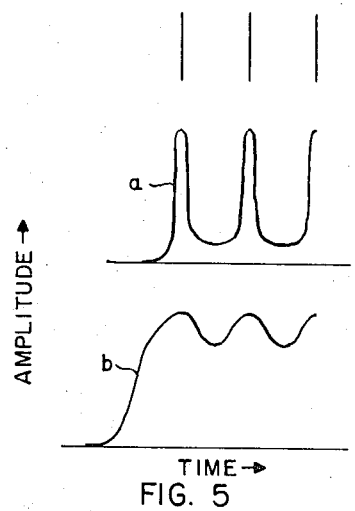
FIG. 5 shows another embodiment of the present invention.

In a second embodiment of the present invention, the reference object has a series of sharp interfaces with the background illumination such as the series of vertical lines shown in FIG. 5. These lines are scribed or imaged onto the charge storage matrix just as the line of the embodiment of FIG. 2. These lines are so spaced on the charge storage matrix, that even at optimum focus the signal produced by the electron beam scanning the charge storage matrix cannot return to white level as represented by the zero reference of FIGS. 5a and 5b. In this way, the difference in focus settings can be detected by observing the amplitude of the output signal directly rather than first differentiating it. The optimum focus occurs when the amplitude of the output signal is greatest as represented by waveform A of FIG. 5. As the focus deteriorates, the amplitude of this signal decreases as shown by waveform B of FIG. 5. In this embodiment, the differentiator of FIG. 2 may be eliminated and the output of the video circuits 23 can be directly coupled to the peak detection circuit 26. The enabling signal which was coupled to the differentiator 25 of FIG. 1 is coupled from the master control 25 to the peak detection circuit 26 and is so timed and of such duration to allow only the second pulse of waveform A or B of FIG. 5 to be peak detected and to reject all other signals from the peak detector circuit 26. The remainder of the description and operation of this embodiment is exactly the same as the embodiment of FIG. 2.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In an adjustable focus imaging device wherein an interrogating beam is sequentially scanned over an image in order to derive electrical signals representative of said image, apparatus for automatically controlling the focusing of said interrogating beam comprising:

first means for providing as part of said image a representation of a reference object;

second means for developing a plurality of electrical signals individually representative of the scanning by said interrogating beam of the part of said image representative of the reference object at different focus adjustments of said interrogating beam;

comparison means for comparing at least two of said plurality of electrical signals developed at different focus adjustments of said interrogating beam according to a common characteristic of said signals;

and means responsive to said comparison means for determining which of said compared signals correspond to the more desired focus setting and for developing a signal to adjust said focus in the direction of the more desired setting;

the system being so constructed and arranged so as to continuously compare electrical signals indicative of the focus settings and to readjust the focus according to said comparison until the desired focus is obtained.

2. In an adjustable focus imaging system wherein an electron beam is sequentially scanned over a charge storage matrix in order to derive electrical signals representative of the image contained on said charge storage matrix, apparatus for automatically controlling the focusing of said electron beam, comprising:

first means for providing as part of said charge storage matrix an electrical charge pattern representative of a reference object which has at least one sharp interface with the background illumination;

second means for developing a plurality of electrical signals individually representative of the scanning by said electron beam of the part of said charge storage matrix representative of the reference object at different focus adjustments of said electron beam;

third means for comparing the rise time of at least two of said plurality of electrical signals developed at different focus adjustments of said electron beam;

and fourth means responsive to said third means for determining which of said compared signals corresponds to the more desired focus setting and for developing a signal to adjust said focus in the direction of the more desired setting;

the system being so constructed and arranged so as to continuously compare electrical signals indicative of the focus settings and to readjust the focus according to said comparison until the desired focus is obtained.

3. In an adjustable focus imaging system wherein an electron beam is sequentially scanned over a charge storage matrix in order to derive electrical signals representative of said image, apparatus for automatically controlling the focusing of said electron beam, comprising:

first means for providing as part of said charge storage matrix an electrical charge pattern representative of a reference object which has at least one sharp interface with a background illumination;

second means for developing a plurality of first electrical signals individually representative of the scanning by said electron beam of the part of said charge storage matrix representative of the reference object at different focus settings of said electron beam;

means for differentiating said electrical signals representative of the scanning of the reference object;

means for detecting the maximum amplitude of said differentiated signals and for generating second signals individually representative of the maximum amplitude of each of said differentiated signals;

means for storing said second signals;

means for comparing at least two of said stored signals according to their amplitude;

and means responsive to said comparison means for determining which of said compared signals has the greater amplitude and for developing a signal to adjust said focus in the direction of the more desired setting;

the system being so constructed and arranged so as to continuously compare electrical signals indicative of the focus settings and to readjust the focus of said electron beam according to said comparisons until the desired focus is obtained.

4. In an adjustable focus imaging system wherein an electron beam is sequentially scanned over a charge storage matrix in order to derive electrical signals representative of said image, apparatus for automatically controlling the focusing of said electron beam comprising:

first means for providing as part of said charge storage matrix an electrical charge pattern representative of a reference object which has at least one sharp interface with a background illumination;

second means for developing a plurality of first electrical signals individually representative of the scanning by said electron beam of the part of said charge storage matrix representative of the reference object at different focus settings of said electron beam;

means for differentiating said second signals representative of the scanning of the reference object and for rejecting all other signals from said differentiating means;

means for detecting the maximum amplitude of said differentiated signals and for generating said signals individually representative of the maximum amplitude of each of said differentiated signals;

a plurality of storage means for storing individual ones of said second signals;

gating means for alternately coupling said second signals individually representative of the maximum amplitude of said differentiated signals to individual ones of said plurality of storage means;

means for comparing at least two of said stored signals according to their amplitude, said compared signals including the two most recent generated signals individually representative of the maximum amplitude of said differentiated signals;

and means responsive to said comparison means for determining which of said compared signals has the greater amplitude and for developing a signal to adjust said focus in the direction of the more desired setting, said setting corresponding to the signal having the greater amplitude;

the system being so constructed and arranged so as to continuously compare electrical signals indicative of the focus settings and to readjust the focus of said electron beam according to said comparisons until the desired focus is obtained.

5. In an adjustable focus imaging system wherein an electron beam is sequentially scanned over a charge storage matrix in order to derive electrical signals representative of said image, apparatus for automatically controlling the focusing of said electron beam comprising:

first means for providing as part of said charge storage matrix an electrical charge pattern representative of a reference object having a plurality of sharp interfaces with a background illumination;

second means for developing a plurality of first electrical signals individually representative of the scanning by said electron beam of the part of said charge storage matrix representative of the reference object at different focus settings of said electron beam;

means for detecting the maximum amplitude of the signal representative of the scanning of the reference object and for generating second signals individually representative of the maximum amplitude of each of said detected signals;

means for storing said second signals;

means for comparing at least two of said stored signals according to their amplitude;

and means responsive to said comparison means for determining which of said compared signals has the greater amplitude and for developing a signal to adjust said focus in the direction of the more desired setting;

the system being so constructed and arranged so as to continuously compare electrical signals indicative of the focus settings and to readjust the focus of said electron beam according to said comparisons until the desired focus is obtained.

6. In an adjustable focus imaging system wherein an electron beam is sequentially scanned over a charge storage matrix in order to derive electrical signals representative of said image, apparatus for automatically controlling the focusing of said electron beam comprising:

first means for providing as part of said charge storage matrix an electrical charge pattern representative of a reference object having a plurality of sharp interfaces with a background illumination;

second means for developing a plurality of first electrical signals individually representative of the scanning by said electron beam of the part of said charge storage matrix representative of the reference object at different focus settings of said electron beam;

means for detecting the maximum amplitude of a portion of the signal representative of the scanning of the reference object, said portion including the signal representative of the scanning of the area between any two of said plurality of sharp interfaces with background luminances;

and for generating second signals individually representative of the maximum amplitude of each of said detected signals;

means for rejecting all other signals from said amplitude detection means;

a plurality of storage means for storing individual ones of said second signals;

gating means for alternately coupling said second signals individually representative of the maximum amplitude of said detected signals to individual ones of said plurality of storage means;

means for comparing at least two of said stored signals according to their amplitude, said compared signals including the two most recent generated signals individually representative of the maximum amplitude of said detected signals;

and means responsive to said comparison means for determining which of said compared signals has the greater amplitude and for developing a signal to adjust said focus in the direction of the more desired setting said setting corresponding to the signal having the greater amplitude;

the system being so constructed and arranged so as to continuously compare electrical signals indicative of the focus settings and to readjust the focus of said electron beam according to said comparisons until the desired focus is obtained.

7. In an adjustable focus imaging system wherein an interrogating beam is sequentially scanned over an image in order to derive electrical signals representative of said image, apparatus for automatically controlling the focusing of said system, comprising:

first means for providing as part of said image a representation of a reference object;

second means for developing a plurality of electrical signals individually representative of the scanning by said interrogating beam of the part of said image representative of the reference object at different focus adjustments of said system;

comparison means for comparing at least two of said plurality of electrical signals developed at different focus adjustments of said system according to a common characteristic of said signal;

and means responsive to said comparison means for determining which of said compared signals correspond to the more desired focus setting and for developing a signal to adjust said focus in the direction of the more desired setting;

the system being so constructed and arranged so as to continuously compare electrical signals indicative of the focus settings and to readjust the focus according to said comparison until the desired focus is obtained.

References Cited

UNITED STATES PATENTS

| | | | |
|---|---|---|---|
| 2,935,558 | 5/1960 | Winkle | 178—7.2 |
| 2,939,042 | 5/1960 | Fathauer | 178—7.2 |
| 3,211,831 | 10/1965 | Steiner | 178—7.2 |
| 2,571,306 | 10/1951 | Szegho | 315—31 |
| 2,964,590 | 12/1960 | Gillette | 178—7.2 |

JOHN W. CALDWELL, *Primary Examiner.*

R. L. RICHARDSON, *Assistant Examiner.*